United States Patent
Biesheuvel et al.

(10) Patent No.: US 12,059,663 B2
(45) Date of Patent: Aug. 13, 2024

(54) SYSTEMS AND PROCESSES FOR TRANSFERRING HEAT USING MOLTEN SALT DURING HYDROCARBON UPGRADING

(71) Applicant: Dow Global Technologies LLC, Midland, MI (US)

(72) Inventors: Cornelis Biesheuvel, Hoek (NL); Wim M. Kamperman, Middleburg (NL)

(73) Assignee: Dow Global Technologies LLC, Midland, MI (US)

( * ) Notice: Subject to any disclaimer, the term of this patent is extended or adjusted under 35 U.S.C. 154(b) by 639 days.

(21) Appl. No.: 17/271,721

(22) PCT Filed: Aug. 20, 2019

(86) PCT No.: PCT/US2019/047221
§ 371 (c)(1),
(2) Date: Feb. 26, 2021

(87) PCT Pub. No.: WO2020/046639
PCT Pub. Date: Mar. 5, 2020

(65) Prior Publication Data
US 2021/0316267 A1 Oct. 14, 2021

Related U.S. Application Data

(60) Provisional application No. 62/725,823, filed on Aug. 31, 2018.

(51) Int. Cl.
*B01J 19/00* (2006.01)
*B01J 19/24* (2006.01)
*C10G 9/00* (2006.01)

(52) U.S. Cl.
CPC ......... *B01J 19/0013* (2013.01); *B01J 19/248* (2013.01); *C10G 9/00* (2013.01);
(Continued)

(58) Field of Classification Search
CPC .............. B01J 19/0013; B01J 19/248; B01J 2219/00076; B01J 2219/00135;
(Continued)

(56) References Cited

U.S. PATENT DOCUMENTS

| 1,327,023 A | 1/1920 | Cherry |
| 1,860,322 A | 5/1932 | Carter |

(Continued)

FOREIGN PATENT DOCUMENTS

| CN | 1033641 A | 7/1989 |
| CN | 1308561 A | 8/2001 |

(Continued)

OTHER PUBLICATIONS

Chinese Office Action dated May 25, 2022, pertaining to CN Patent Application No. 201980049690.0, 17 pgs.

(Continued)

*Primary Examiner* — Ali Z Fadhel
(74) *Attorney, Agent, or Firm* — Dinsmore & Shohl LLP

(57) ABSTRACT

A reactor system for thermally treating a hydrocarbon-containing stream includes a pressure containment vessel having an interior chamber defined by a first end, a second end, and at least one sidewall extending from the first end to the second end. A heat transfer medium converts electrical current to heat is positioned within the interior chamber of the pressure containment vessel, and the heat transfer medium has a first end face, a second end face, and channels extending between the first end face and the second end face. A heat sink reservoir includes molten salt, and at least one of a heater or heat exchanger is fluidly coupled to the heat transfer medium and thermally coupled to the heat sink reservoir.

16 Claims, 2 Drawing Sheets

(52) U.S. Cl.
CPC .............. *B01J 2219/00076* (2013.01); *B01J 2219/00135* (2013.01); *B01J 2219/2401* (2013.01); *C10G 2300/4006* (2013.01)

(58) Field of Classification Search
CPC .......... B01J 2219/2401; B01J 10/005; B01J 2219/0006; B01J 2219/00063; B01J 2219/00081; B01J 2219/00103; B01J 2219/00132; B01J 2219/00159; B01J 2219/185; B01J 2219/2402; B01J 2219/2416; B01J 2219/2422; B01J 2219/2427; B01J 2219/2446; B01J 2219/2448; B01J 19/087; B01J 19/2485; C10G 9/00; C10G 2300/4006; C10G 9/24; C10G 31/06; C10G 2400/20

See application file for complete search history.

(56) References Cited

U.S. PATENT DOCUMENTS

| | | | |
|---|---|---|---|
| 3,546,316 | A | 12/1970 | Koszman |
| 3,641,183 | A | 2/1972 | Cahn et al. |
| 5,321,191 | A | 6/1994 | Alagy et al. |
| 2004/0016650 | A1 | 1/2004 | Klug |
| 2006/0116543 | A1 | 6/2006 | Bellet et al. |
| 2011/0240261 | A1* | 10/2011 | Ahlbeck .......... C09K 5/12 165/104.11 |
| 2015/0167489 | A1* | 6/2015 | Heiligenstein .......... H02J 3/381 290/52 |
| 2017/0022429 | A1 | 1/2017 | Van Willigenburg |
| 2017/0106360 | A1 | 4/2017 | Meriam |
| 2021/0113983 | A1 | 4/2021 | Mortensen et al. |

FOREIGN PATENT DOCUMENTS

| | | |
|---|---|---|
| CN | 102256693 A | 11/2011 |
| CN | 102264873 A | 11/2011 |
| CN | 105688770 A | 6/2016 |
| CN | 105874088 A | 8/2016 |
| CN | 108136353 A | 6/2018 |
| DE | 3929413 A1 | 3/1991 |
| EP | 542597 A1 | 5/1993 |
| GB | 1237768 A | 6/1971 |
| GB | 1338352 A | 11/1973 |
| WO | 1996015983 A | 5/1996 |
| WO | 2010070195 A2 | 6/2010 |
| WO | 2013135667 A1 | 9/2013 |

OTHER PUBLICATIONS

Translation of Chinese Office Action dated Jul. 21, 2022, pertaining to CN Patent Application No. 201980049690.0, 10 pgs.
Translation of Chinese Office Action dated Sep. 1, 2022, pertaining to CN Patent Application No. 201980049714.2, 7 pgs.
U.S. Office Action dated Jun. 3, 2022 pertaining to U.S. Appl. No. 17/271,714, filed Feb. 26, 2021, 16 pages.
Final Office Action dated Oct. 19, 2022, pertaining to U.S. Appl. No. 17/271,714, 14 pgs.
Chinese Office Action dated Mar. 27, 2023, pertaining to Chinese Patent Application No. 201980049981.X, 12 pgs.
International Search Report and Written Opinion pertaining to PCT/US2019/047218, dated Nov. 5, 2019.
International Search Report and Written Opinion pertaining to PCT/US2019/047221, dated Oct. 2, 2019.
International Search Report and Written Opinion pertaining to PCT/US2019/048566, dated Nov. 12, 2019.
Office Action dated Dec. 14, 2022, pertaining to CN Patent Application No. 201980049690.0, 9 pgs.
Ismael Amghizar, et. al., New Trends in Olefin Production, Elsevier, Engineering 3 (217) 171-178.
S.M. Sadrameli, Thermal/Catalytic cracking of hydrocarbons for the production of olefins: A state-of-the-art review 1 : thermal cracking review, Elsevier, Fuel 140 (2015) 102-115.
Schietekat, et. al., Computational Fluid Dynamics-Based Design of Finned Steam Cracking Reactors; DOI 10.1002/aic.14326.
Laurien A. Vandewalle, et. al., Dynamic simulation of fouling in steam cracking reactors using CFD; Chemical Engineering Journal 329 (2017) 77-87.
Brazil Technical Examination Report dated Apr. 9, 2024, pertaining to BR Patent Application No. BR112021001421.7, 8 pgs.

* cited by examiner

SYSTEMS AND PROCESSES FOR TRANSFERRING HEAT USING MOLTEN SALT DURING HYDROCARBON UPGRADING

CROSS-REFERENCE TO RELATED APPLICATIONS

This application is a National Stage Entry under 35 U.S.C. § 371 of International Patent Application No. PCT/US2019/047221, filed on Aug. 20, 2019, which claims priority to U.S. Provisional Patent Application Ser. No. 62/725,823, filed on Aug. 31, 2018, the entire disclosures of which are hereby incorporated by reference.

BACKGROUND

Field

The present specification generally relates to systems and processes for transferring heat during hydrocarbon upgrading. In particular, the present specification relates to systems and processes for transferring heat using molten salt during hydrocarbon upgrading.

Technical Background

Feedstock comprising ethane, propane, butane, naphtha, and other hydrocarbons generally needs to be upgraded before it can be used as a commercial product, such as hydrogen, olefins, and aromatic hydrocarbons. This upgrading process conventionally utilizes a reactor system in which combustion—such as, for example, combustion of methane—is used to heat the contents of a pressure containment vessel. In addition to the combustion of methane to generate heat, conventional systems may require that increased pressure be present within the tubular reactors. This increased pressure can cause a pressure differential between the outside and inside of the tubular reactors. In such cases, the tubular reactors must be made from a material that an withstand this pressure differential, which limits the materials from which the tubular reactors can be made. A hydrocarbon-containing stream flows through tubular reactors disposed within a fire box, and the tubular reactors heat the hydrocarbon-containing stream diluting it with steam, converting the hydrocarbon-containing stream to an effluent comprising desired products. These processes are heat intensive and significant amounts of heat can be lost during the upgrading process. However, the set-up of conventional hydrocarbon updating systems can make it difficult to effectively capture and reuse heat needed to upgrade the hydrocarbons.

Accordingly, a need exists for systems and processes for converting hydrocarbon-containing streams to desired products while efficiently capturing heat loads and efficiently redistributing them to other parts of the system.

SUMMARY

According to one embodiment, a reactor system for thermally treating a hydrocarbon-containing stream comprises: a pressure containment vessel comprising an interior chamber defined by a first end, a second end, and at least one sidewall extending from the first end to the second end; a heat transfer medium that converts electrical current to heat and is positioned within the interior chamber of the pressure containment vessel, wherein the heat transfer medium comprises a first end face, a second end face, and channels extending between the first end face and the second end face; a heat sink reservoir comprising molten salt; and at least one of a heater or heat exchanger fluidly coupled to the heat transfer medium and thermally coupled to the heat sink reservoir.

In an embodiment, a process for thermally treating a hydrocarbon-containing stream comprises: introducing the hydrocarbon-containing stream into channels of a heat transfer medium, wherein the heat transfer medium is positioned within an interior chamber of a pressure containment vessel; supplying electrical current to the heat transfer medium; converting the electrical current to heat, thereby heating the hydrocarbon-containing stream within the channels of the heat transfer medium; converting the hydrocarbon-containing stream to an effluent within the channels of the heat transfer medium; removing the effluent from the channels of the heat transfer medium; introducing the effluent into a heat exchanger, wherein the heat exchanger houses molten salt, and the molten salt is at a first temperature; transferring heat from the effluent to the molten salt and increasing the temperature of the molten salt to a second temperature, transferring heat from the molten salt to a heat sink reservoir comprising a supply of molten salt.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
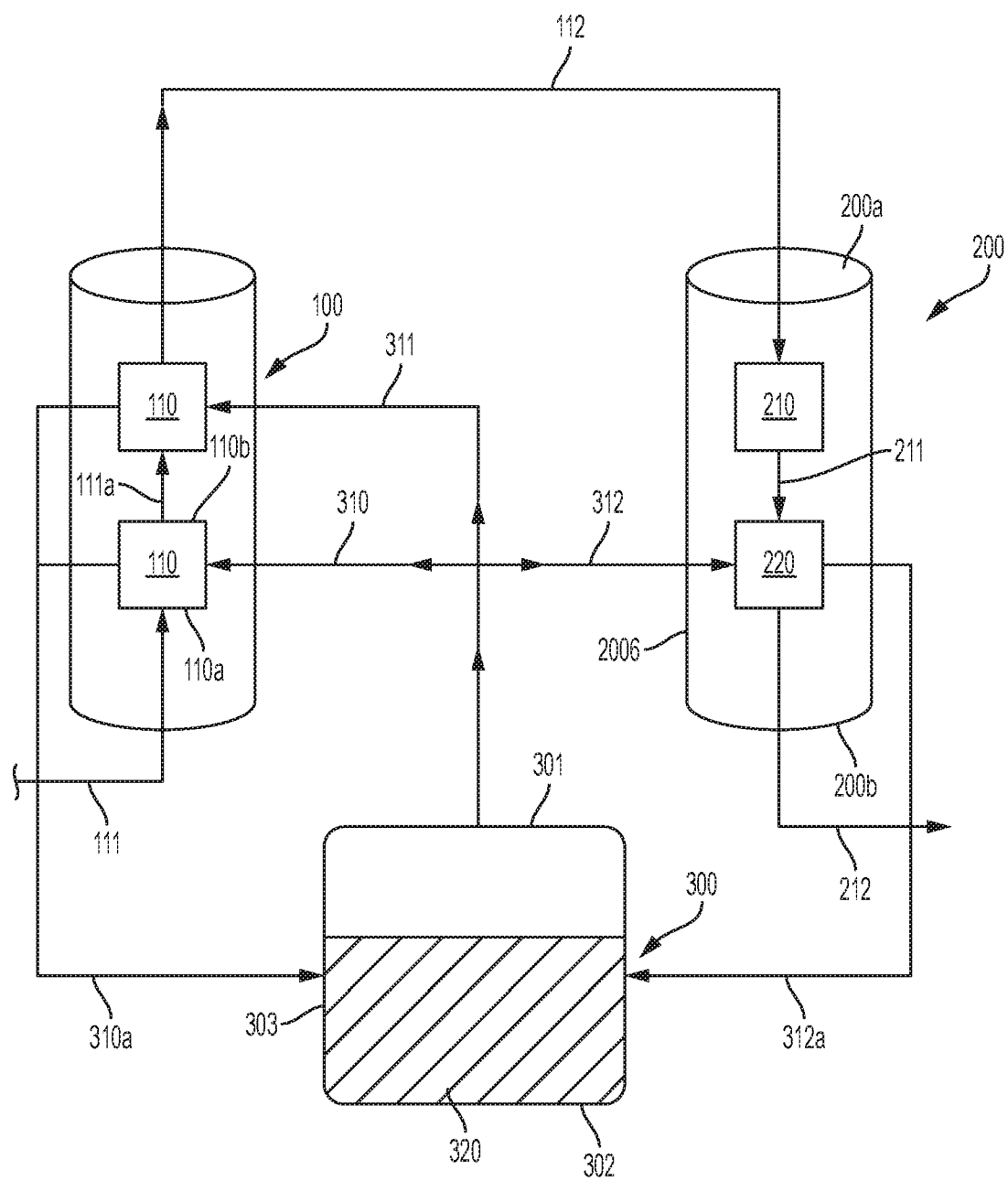
FIG. 1 schematically depicts a system for converting hydrocarbon-containing streams to desired products according to embodiments disclosed and described herein.

Reference will now be made in detail to embodiments of systems and processes for upgrading hydrocarbon-containing streams to desired products, such as, for example, streams comprising at least one of hydrogen, olefins, or aromatic hydrocarbons. Embodiments of which are illustrated in the accompanying drawings. Whenever possible, the same reference numerals will be used throughout the drawings to refer to the same or like parts.

In one embodiment, a reactor system for thermally treating a hydrocarbon-containing stream comprises: a pressure containment vessel comprising an interior chamber defined by a first end, a second end, and at least one sidewall extending from the first end to the second end; a heat transfer medium that converts electrical current to heat and is positioned within the interior chamber of the pressure containment vessel, wherein the heat transfer medium comprises a first end face, a second end face, and channels extending between the first end face and the second end face; a heat sink reservoir comprising molten salt; and at least one of a heater or heat exchanger fluidly coupled to the heat transfer medium and thermally coupled to the heat sink reservoir.

In another embodiment, a process for thermally treating a hydrocarbon-containing stream comprises: introducing the hydrocarbon-containing stream into channels of a heat transfer medium, wherein the heat transfer medium is positioned within an interior chamber of a pressure containment vessel; supplying electrical current to the heat transfer medium; converting the electrical current to heat, thereby heating the hydrocarbon-containing stream within the channels of the heat transfer medium; converting the hydrocarbon-containing stream to an effluent within the channels of the heat transfer medium; removing the effluent from the channels of the heat transfer medium; introducing the effluent into a heat exchanger, wherein the heat exchanger houses molten salt, and the molten salt is at a first temperature; transferring heat from the effluent to the molten salt and increasing the temperature of the molten salt to a second temperature, transferring heat from the molten salt to a heat sink reservoir comprising a supply of molten salt.

With reference now to FIG. 1, a system according to embodiments comprises a preheating zone 100, a pressure containment vessel 200, and a heat sink reservoir 300. A hydrocarbon-containing stream enters the preheating zone 100 where it is heated to a desired temperature. A heated hydrocarbon-containing stream 112 exits the preheating zone 100 and enters a pressure containment vessel 200. Within the pressure containment vessel, the heated hydrocarbon-containing stream 112 is converted into effluent 211 that comprises desired product components. Heat may be transferred from the pressure containment vessel 200 to the preheating zone 100 via the heat sink reservoir. For instance, in embodiments, the heat sink reservoir 300 may comprise molten salt, such that heat is transferred from the pressure containment vessel 200 to the heat sink reservoir 300, and heat is transferred from the heat sink reservoir 300 to the preheating zone 100. Details of the system and processes of embodiments are described in more detail below.

The preheating zone 100 may comprise one or more heaters 110. Although the embodiment depicted in FIG. 1 includes two heaters 110 in the preheating zone 100, it should be understood that in various embodiments any number of heaters may be included in the preheating zone 100. Also, in embodiments, the preheating zone 100 may be a physical chamber that encompasses the heaters 110; however, in other embodiments, the preheating zone may be a designated area in which one or more heaters 110 are present. According to embodiments, such as the embodiment depicted in FIG. 1, the heaters 110 within the preheating zone 100 may be fluidly coupled in series. However, in embodiments, the heaters 110 within the preheating zone may be fluidly coupled in parallel depending on the desired design of the system and preheating zone 100. It should be understood that, in embodiments, the heaters 110 may also be thermally coupled.

As shown in the embodiment depicted in FIG. 1, a hydrocarbon-containing stream 111 enters the preheating zone 100 and is introduced into a heater 110. The hydrocarbon-containing stream 111 enters the heater 110 at a first end 110a and exits the heater 110 at a second end 110b. As the hydrocarbon-containing stream 111 traverses from the first end 110a to the second end 110b of the heater 110, the hydrocarbon-containing stream 111 is heated from a first temperature to a second temperature. According to embodiments, heat is transferred from the heat sink reservoir 300 to the heater 110 to heat the hydrocarbon containing stream 111 from the first temperature to the second temperature. In embodiments, this transfer of heat may be accomplished by supplying molten salt from the heat sink reservoir 300 to the heater 110 via a molten salt stream 310. Accordingly, in embodiments, the molten salt delivered to the heater 110 via molten salt stream 310 is at a higher temperature than the hydrocarbon-containing stream 111 that enters the heater 110 and heat from the molten salt stream 310 is transferred to the hydrocarbon-containing stream 111 as it traverses from the first end 110a of the heater 110 to the second end 110b of the heater 110. It should be understood that the type of heater used to heat the hydrocarbon-containing stream 111 is not particularly limited and may be any type of heater that is capable of transferring heat between the co-flowing molten salt stream 310 and the hydrocarbon-containing stream 111. According to embodiments, the temperature of the hydrocarbon-containing stream 111 entering the heater 110 may be from ambient temperature to 200° C., although this temperature range is not limited.

According to some embodiments, the heater 110 may be a counter flow heater, which efficiently heats the hydrocarbon containing stream 111 from the first temperature to the second temperature. This heating may be accomplished by having uniform temperature differential ($\Delta T$) between the molten salt stream 310 and the hydrocarbon containing stream 111 across the entire heater 110. According to some embodiments, the $\Delta T$ between the molten salt stream 310 and the hydrocarbon containing stream 111 within the heater 110 is from 5° C. to 30° C., such as from 10° C. to 30° C., from 15° C. to 30° C., from 20° C. to 30° C., or from 25° C. to 30° C. In some embodiments, the $\Delta T$ between the molten salt stream 310 and the hydrocarbon containing stream 111 within the heater 110 is from 5° C. to 25° C., such as from 5° C. to 20° C., from 5° C. to 15° C., or from 5° C. to 10° C. In yet other embodiments, the $\Delta T$ between the molten salt stream 310 and the hydrocarbon containing stream 111 within the heater 110 is from 10° C. to 25° C., such as from 15° C. to 20° C.

FIG. 1 depicts a second heater 110 within the preheating zone 100. The second heater operates in the same way as heater 110 described above. Namely, hydrocarbon-containing stream 111a exits the first heater 110 and enters the second heater 110. According to embodiments, heat is transferred from the heat sink reservoir 300 to the second heater 110 to heat the hydrocarbon containing stream 111a from the second temperature to a third temperature that is greater than the second temperature. In embodiments, this transfer of heat may be accomplished by supplying molten salt from the heat sink reservoir 300 to the heater 110 via a molten salt stream 311. Accordingly, in embodiments, the molten salt delivered to the heater 110 via molten salt stream 311 is at a higher temperature than the hydrocarbon-containing stream 111a that enters the second heater 110 and heat from the molten salt stream 311 is transferred to the hydrocarbon-containing stream 111a as it traverses through the second heater 110. It should be understood that the type of heater used to heat the hydrocarbon-containing stream 111a is not particularly limited and may be any type of heater that is capable of transferring heat between the co-flowing molten salt stream 311 and the hydrocarbon-containing stream 111a. This heating process may be conducted any number of times using any number of heaters until the hydrocarbon-containing stream 111 reaches a desired preheated temperature. According to embodiments, the preheated temperature may be from 400° C. to 650° C., with the understanding that different hydrocarbon streams will need to be preheated to different temperatures and the preheated temperature can be dependent on the desired end product. Once the hydrocarbon-containing stream 111 has passed through the number of heaters required for the hydrocarbon-containing stream 111 to reach the desired preheated temperature, the hydrocarbon-containing stream 111 exits the preheating zone 100 as heated hydrocarbon-containing stream 112. The heated hydrocarbon-containing stream 112 is then transferred to the pressure containment vessel 200.

Still referring to FIG. 1, the pressure containment vessel 200 includes an interior chamber defined by a first end 200a, a second end 200b, and a sidewall 200c that extends between the first end 200a and the second end 200b. The interior chamber of the pressure containment vessel 200 is configured so that a pressure differential between the interior chamber of the pressure containment vessel 200 and the atmosphere in which the pressure containment vessel 200 is place may be maintained. The pressure containment vessel 200 may be constructed in any way and with any material that can withstand the desired pressure differential. Within the interior chamber of the pressure containment vessel 200 is, according to embodiments, a heat transfer medium 210—which will be described in further detail below—and a heat exchanger 220 that is fluidly coupled to the heat transfer medium 210. Although FIG. 1 shows only one heat exchanger 220 in the interior chamber of the pressure containment vessel 200, it should be understood that other embodiments may include any number of heat exchangers fluidly coupled to one another either in series or parallel as the design of the pressure containment vessel 200 dictates.

According to embodiments, the heated hydrocarbon containing stream 112 enters the pressure containment vessel 200 and is introduced into the heat transfer medium 210. The heated hydrocarbon-containing stream 112 flows through the heat transfer medium and is further heated to a reaction temperature at which hydrocarbons within the heated hydrocarbon-containing stream are upgraded to desired products. This process and the construction of the heat transfer medium 210 are discussed in more detail below. After the reactions occur within the heat transfer medium 210, an effluent 211, which comprises desired products, exits the heat transfer medium 210 at or near the reaction temperature, which is greater than the temperature of the heated hydrocarbon-containing stream 112 when it enters the heat transfer medium 210.

To reduce the temperature of the effluent 211 and to capture and reuse the heat energy of the effluent 211, the effluent 211 may, in embodiments, be introduced into heat exchanger 220, which extracts heat from the effluent 211 and redirects the heat to other components system. The temperature of the effluent may be, in some embodiments, from 800° C. to 850° C., such as from 810° C. to 840° C. According to embodiments, the effluent 211 enters the heat exchanger 220 at a first end 220a and exits the heat exchanger 220 at a second end 220b. As the effluent 211 traverses from the first end 220a to the second end 220b of the heat exchanger 220, the effluent 211 is cooled from the reaction temperature to an exit temperature, which is lower than the reaction temperature. According to embodiments, heat is transferred from the heat exchanger 220 to the heat sink reservoir 300, which cools the effluent 211 from the reaction temperature to the exit temperature. In embodiments, this transfer of heat may be accomplished by supplying molten salt from the heat sink reservoir 300 to the heat exchanger 220 via a molten salt stream 312. Accordingly, in embodiments, the molten salt delivered to the heat exchanger 220 via molten salt stream 312 is at a lower temperature than the effluent 211 that enters the heat exchanger 220 and heat from the effluent 211 is transferred to the molten salt stream 312 via the heat exchanger 220 as the effluent 211 traverses from the first end 220a of the heat exchanger 220 to the second end 220b of the heat exchanger 220. It should be understood that the type of heat exchanger used to remove heat from the effluent 211 is not particularly limited and may be any type of heat exchanger that is capable of transferring heat between the co-flowing molten salt stream 312 and the effluent 211. It should be understood that in embodiments, and as disclosed previously herein, any number of heat exchangers may be used in the pressure containment vessel 200 to reduce the temperature of the effluent 211 to the exit temperature. In the embodiment depicted in FIG. 1, once cooled to the exit temperature, an exit stream 212 exits the pressure containment vessel 200 and may be used in other applications. In addition, according to some embodiments, exit stream 212 may be introduced to further heat exchangers outside of the pressure containment vessel 200 (not shown) to further cool the exit stream 212. These heat exchangers positioned outside of the pressure containment vessel 200 may be traditional heat exchanger conventionally used in such processes, or these heat exchangers may use molten salt as disclosed above regarding heat exchanger 220. It should be understood that any conventional heat exchanger may be used so long as it is capable of reducing the temperature of the effluent to a desired temperature, and so long as it is compatible with the molten salt used therein.

According to some embodiments, the heat exchanger 220 may be a parallel flow heat exchanger, which efficiently cools the effluent 211 from the reaction temperature to the exit temperature in a manner of milliseconds to tens of milliseconds. This rapid cooling stops the chemical reactions and freeze the composition of the effluent, and the rapid cooling may be accomplished by having a high temperature differential ($\Delta T$) between the molten salt stream 312 and the effluent 211. According to some embodiments, the $\Delta T$ between the effluent 211 entering the heat exchanger 220 and the molten salt stream 312 entering the heat exchanger 220 is from 200° C. to 400° C., such as from 210° C. to 400° C., from 220° C. to 400° C., from 230° C. to 400° C., from 240° C. to 400° C., from 250° C. to 400° C., from 260° C. from 270° C. to 400° C., to 400° C., from 280° C. to 400° C., from 290° C. to 400° C., from 300° C. to 400° C., from 310° C. to 400° C., from 320° C. to 400° C., from 330° C. to 400° C., from 340° C. to 400° C., from 350° C. to 400° C., from 360° C. to 400° C., from 370° C. to 400° C., from 380° C. to 400° C., or from 390° C. to 400° C. In some embodiments, the $\Delta T$ between the effluent 211 entering the heat exchanger 220 and the molten salt stream 312 entering the heat exchanger 220 is from 200° C. to 390° C., such as from 210° C. to 380° C., from 210° C. to 370° C., from 210° C. to 360° C., from 210° C. to 350° C., from 210° C. to 340° C., from 210° C. to 330° C., from 210° C. to 320° C., from 210° C. to 310° C., from 210° C. to 300° C., from 210° C. to 290° C., from 210° C. to 280° C., from 210° C. to 270° C., from 210° C. to 260° C., from 210° C. to 250° C., from 210° C. to 240° C., from 210° C. to 230° C., or from 210° C. to 220° C. In yet other embodiments, the $\Delta T$ between the effluent 211 entering the heat exchanger 220 and the molten salt stream 312 entering the heat exchanger 220 is from 210° C. to 390° C., such as from 220° C. to 380°

C., from 230° C. to 370° C., from 240° C. to 360° C., from 250° C. to 350° C., from 260° C. to 340° C., from 270° C. to 330° C., from 280° C. to 320° C., or from 290° C. to 310° C.

As disclosed above, heaters 110 provide heat and heat exchanger 220 extracts heat via various molten salt streams 310, 311, and 312. The temperature, as well as other attributes of molten salt streams 310, 311, and 312 is regulated, at least in part, by the heat sink reservoir 300. The heat sink reservoir 300 comprises, in embodiments, an interior chamber defined by a first end 301, a second end 302, and a sidewall 303 extending from the first end 301 to the second end 303. According to one or more embodiments, a supply of molten salt 320 (also referred to herein as "molten salt supply") is present within the interior chamber of the heat sink reservoir 300. This supply of molten salt 320 acts as a buffer that regulated the temperatures of the various molten salt streams 310, 311, and 312. For example, as the effluent 211 is cooled in heat exchanger 220 molten salt may be introduced into the heat exchanger 220 via molten salt stream 312. The temperature of molten salt stream 312 is approximately the same as the temperature of the molten salt supply 320, which is less than the temperature of the effluent 211 entering the heat exchanger. As used here the temperature is "approximately" the same if it is within ±10° C. of the reference temperature. The heat exchanger 220 extracts heat from the effluent 211 and transfers it to the molten salt stream 312. Accordingly, the temperature of the molten salt stream 312 is above the temperature of the molten salt supply 320. This heated molten salt stream 312 can then be sent back to the heat sink reservoir 300 via molten salt stream 312a and introduced back into the molten salt supply 320. Likewise, the hydrocarbon-containing stream 111 is heated in heaters 110 by introducing molten salt streams 310 and 311, which have a temperature greater than the hydrocarbon-containing stream entering 111 the heaters 110. Molten salt streams 310 and 311 have a temperature that is approximately equal to the temperature of the molten salt supply 320 as molten salt streams 310 and 311 enter the heaters 110. As heat is transferred from the molten salt streams 310 and 311 to the hydrocarbon-containing stream 111 via heaters 110, the temperature of molten salt streams 310 and 311 decrease. Accordingly, molten salt stream 310a that exits the heaters 110 has a temperature less than molten salt streams 310 and 311—and, thus, a temperature less than the molten salt supply 320. The cooler molten salt stream 310a is returned to the heat sink reservoir 300 and introduced back into the molten salt supply 320. It should be understood that the molten salt streams may be combined or separated in any manner. It should be understood that although FIG. 1 shows one heat sink reservoir 300, in embodiments, multiple heat sink reservoirs may be used in series or in parallel.

As described above, in embodiments, molten salt stream 312a, which has a temperature above the temperature of the molten salt supply 320, and molten salt stream 310a, which has a temperature below the temperature of the molten salt supply 320, are introduced into the heat sink reservoir 300 and the molten salt supply 320. In this way, the molten salt supply 320 receives molten salt streams 310a and 312a that are at a temperature above the temperature of the molten salt supply 320 and that are at a temperature below the molten salt supply 320. In this way, the molten salt supply 320 stays at an equilibrium temperature. Accordingly, the amount of molten salt in the molten salt supply 320 may be such that the molten salt supply 320 is capable of absorbing molten salt streams 310a and 312a without significant changes in temperature of the molten salt supply 320. The amount of molten salt supply can be calculated using fundamental principles of thermodynamics. In this way, the molten salt supply 320 can act as a thermal buffer that stores energy and redistributes it as needed to various components of the system, such as heaters 110 and heat exchanger 220. In addition, the heat sink reservoir 300 may be configured such that all the molten salt may be removed from the system and stored in the heat sink reservoir 300, if desired.

Although the type of molten salt used in the molten salt supply is not particularly limited so long as the molten salt is capable of transferring heat as needed to the heaters 110 and the heat exchanger 220, in embodiments, the molten salts may be selected from the group consisting of lithium fluoride (LiF), beryllium fluoride ($BeF_2$), zirconium tetrafluoride ($ZrF_4$), sodium fluoride (NaF), rubidium fluoride (RbF), potassium fluoride (KF), potassium carbonate ($K_2CO_3$), lithium carbonate ($Li_2CO_3$), sodium carbonate ($Na_2CO_3$), and combinations thereof.

The melting point of molten salts, according to embodiments, may be from 350° C. to 700° C., such as from 375° C. to 700° C., from 400° C. to 700° C., from 425° C. to 700° C., from 450° C. to 700° C., from 475° C. to 700° C., from 500° C. to 700° C., from 525° C. to 700° C., from 550° C. to 700° C., from 575° C. to 700° C., from 600° C. to 700° C., from 625° C. to 700° C., from 650° C. to 700° C., or from 675° C. to 700° C. In embodiments, the melting point of the molten salt may be from 350° C. to 675° C., such as from 350° C. to 650° C., from 350° C. to 625° C., from 350° C. to 600° C., from 350° C. to 575° C., from 350° C. to 550° C., from 350° C. to 525° C., from 350° C. to 500° C., from 350° C. to 475° C., from 350° C. to 450° C., from 350° C. to 425° C., from 350° C. to 400° C., or from 350° C. to 375° C. In still other embodiments, the melting point of the molten salt may be from 375° C. to 675° C., such as from 400° C. to 650° C., from 425° C. to 625° C., from 450° C. to 600° C., from 475° C. to 575° C., or from 500° C. to 550° C.

In embodiments, the heat capacity of the molten salt may be from 1.65 J/g K to 2.10 J/g K, such as from 1.70 J/g K to 2.10 J/g K, from 1.75 J/g K to 2.10 J/g K, from 1.80 J/g K to 2.10 J/g K, from 1.85 J/g K to 2.10 J/g K, from 1.90 J/g K to 2.10 J/g K, from 1.95 J/g K to 2.10 J/g K, from 2.00 J/g K to 2.10 J/g K, or from 2.05 J/g K to 2.10 J/g K. In other embodiments, the heat capacity of the molten salt may be from 1.65 J/g K to 2.05 J/g K, such as from 1.65 J/g K to 2.00 J/g K, from 1.65 J/g K to 1.95 J/g K, from 1.65 J/g K to 1.90 J/g K, from 1.65 J/g K to 1.85 J/g K, from 1.65 J/g K to 1.80 J/g K, from 1.65 J/g K to 1.75 J/g K, or from 1.65 J/g K to 1.70 J/g K. In still other embodiments, the heat capacity of the molten salt may be from 1.70 J/g K to 2.05 J/g K, such as from 1.75 J/g K to 2.00 J/g K, from 1.80 J/g K to 1.95 J/g K, or from 1.85 J/g K to 1.90 J/g K.

Figure 2:
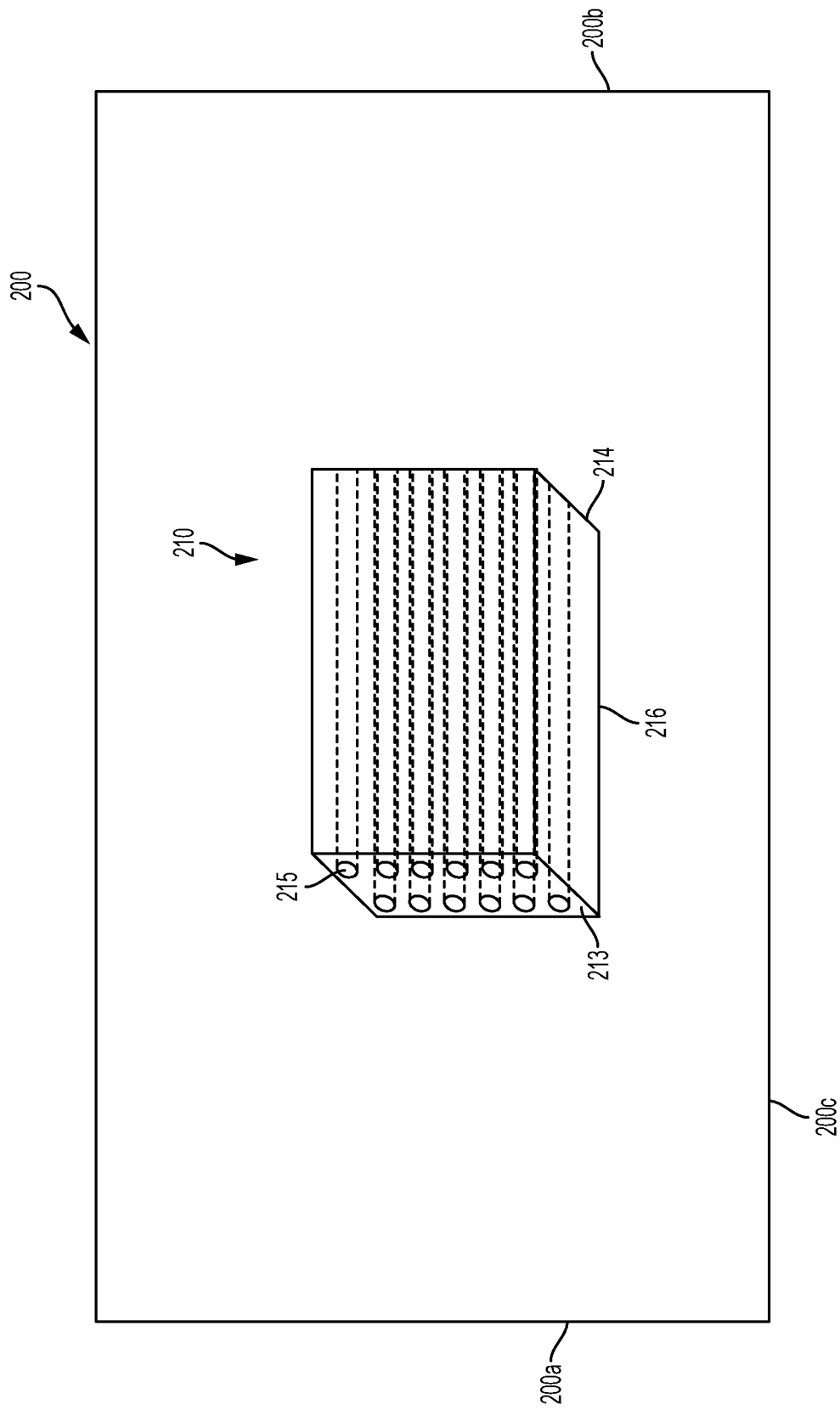
FIG. 2 schematically depicts a pressure containment vessel and heat transfer medium according to embodiments disclosed and described herein.

Embodiments of the heat transfer medium 210 will now be described with reference to FIG. 2. The pressure containment vessel 200 comprises a heat transfer medium 210 within the interior chamber defined by the first end 200a, the second end 200b, and the sidewall 200c extending between the first end 200a and the second end 200b. The heat transfer medium 210 converts electrical current to heat necessary to convert a heated hydrocarbon-containing stream to an effluent that comprises desired products. In embodiments, the heat transfer medium 210 comprises a first end face 213, a second end face 214, and channels 215 extending between the first end face 213 and the second end face 214. Additional layers within the heat transfer medium 210 may be added for flow distribution. The second end face 214 may be placed against the second end 200b to avoid mixing the hydrocarbon-containing stream 111 and the effluent 211. The channels 215 of the heat transfer medium 210 may be fluidly coupled to the interior chamber of the pressure containment vessel 200. The mechanism for fluid coupling from the second end 214 of the heat transfer medium 210 to an inlet of the heat exchanger 220 (shown in FIG. 1) may not be heated. In embodiments, the heated hydrocarbon-containing stream 112 enters the channels 215 of the heat transfer medium 210 at the first end face 213 and travels through the channels 215 of the heat transfer medium 210 to the second end face 214 of the heat transfer material 210. It should be understood that any number, size, and geometry may be used for the channels 215 formed within the heat transfer medium 210.

According to embodiments, the heat transfer medium 210 is formed from a material that is not electrically conductive or chemically reactive. In other embodiments, the heat transfer medium may be formed from electrically conductive material from which heat is generated due to internal electrical resistance. Further, the heat transfer medium 210 is formed from a material that is capable of functioning at reaction conditions without physical, mechanical, or chemical degradation. Specifically, because the heat transfer medium 210 is formed from a material that is not chemically reactive, catalytic coke may not build up on the heat transfer medium 210. In some embodiments, the heat transfer medium 210 may be cylindrical, square, rectangular, spherical, or pyramidal, although the geometry of the heat transfer medium 210 is not limited. The heat transfer medium 210 may be any shape through which the heated hydrocarbon-containing stream 112 may flow. In some embodiments, the heat transfer medium 210 comprises at least one of ceramic, graphite, and/or metal. In some embodiments, the heat transfer medium is formed from silicon carbide (SiC), aluminum nitrate (AlN), or any metal that can withstand the high temperature and pressure conditions without having a negative catalytic effect. The heat transfer medium 210 comprises materials that do not melt or deform under reaction temperature and pressure required to convert the heated hydrocarbon-containing stream 112 to an effluent 211 comprising the desired products. That is, the heat transfer medium 210 may withstand temperatures ranging from 300° C. to 450° C., or from 600° C. to 1200° C., such as from 800° C. to 1000° C., or from 825° C. to 900° C.; and pressures of at least 1 bar (100 kPa), such as at least 2 bar (200 kPa), or at least 3 bar (300 kPa). In other embodiments, the pressure may be at least 10 bar (1000 kPa), at least 15 bar (1500 kPa), at least 25 bar (2500 kPa), at least 30 bar (3000 kPa), at least 40 bar (4000 kPa), or at least 50 bar (5000 kPa).

The heat transfer medium 210 may, according to embodiments, comprise at least one of carbides, oxides, and nitrides. In some embodiments, the heat transfer medium 210 may comprise silicon nitride. Oxides that may be used in embodiments to form the heat transfer medium 210 include at least one of aluminum oxide, magnesium oxide, silicon dioxide (or quartz), feldspar, and/or zirconium oxide. In embodiments, nitrides that may be used to form the heat transfer medium 210 may include at least one of silicon nitride and/or boron nitride. The heat transfer medium 210 may further comprise any metal that can withstand reaction temperatures and pressures described herein. The heat transfer medium 210 may have high thermal conductivity and may be chemically compatible with electrical heating elements, the hydrocarbon-containing stream 111, and the effluent 211.

In some embodiments, the heat transfer medium 210 further comprises a catalyst. The catalyst may comprise, according to embodiments, at least one of silver, iron oxide, molybdenum oxide, vanadium oxide, chromium oxide, nickel oxide, copper oxide, zirconium oxide, potassium carbonate, potassium oxide, titanium oxide, cadmium oxide, aluminum oxide, tin oxide, and/or platinum oxide.

The length of the channels 215 formed in the heat transfer medium may, in embodiments, be defined by the heat transfer flux and residence time. Each individual channel of the channels 215 may have a channel cross flow area of from 450 to 550 mm$^2$, from 400 to 600 mm$^2$, from 300 to 700 mm$^2$, from 200 to 800 mm$^2$, or of from 475 to 525 mm$^2$. The channel cross flow area is defined by allowable pressure drop due to linear gas velocity. The heat transfer medium 210 may comprise from 1 to 1000 channels, from 1 to 800 channels, from 1 to 600 channels, from 1 to 400 channels, from 1 to 300 channels, from 1 to 250 channels, from 1 to 200 channels, from 1 to 150 channels, from 1 to 100 channels, from 1 to 50 channels, from 1 to 25 channels, from 25 to 1000 channels, from 25 to 800 channels, from 25 to 600 channels, from 25 to 400 channels, from 25 to 300 channels, from 25 to 250 channels, from 25 to 200 channels, from 25 to 150 channels, from 25 to 100 channels, from 25 to 50 channels, from 50 to 1000 channels, from 50 to 800 channels, from 50 to 600 channels, from 50 to 400 channels, from 50 to 300 channels, from 50 to 250 channels, from 50 to 200 channels, from 50 to 150 channels, from 50 to 100 channels, from 100 to 1000 channels, from 100 to 800 channels, from 100 to 600 channels, from 100 to 400 channels, from 100 to 300 channels, from 100 to 250 channels, from 100 to 200 channels, from 100 to 150 channels, from 150 to 1000 channels, from 150 to 800 channels, from 150 to 600 channels, from 150 to 400 channels, from 150 to 300 channels, from 150 to 250 channels, from 150 to 200 channels, from 200 to 1000 channels, from 200 to 800 channels, from 200 to 600 channels, from 200 to 400 channels, from 200 to 300 channels, from 200 to 250 channels, from 250 to 1000 channels, from 250 to 800 channels, from 250 to 600 channels, from 250 to 400 channels, from 250 to 300 channels, from 300 to 1000 channels, from 300 to 800 channels, from 300 to 600 channels, from 300 to 400 channels, from 400 to 1000 channels, from 400 to 800 channels, from 400 to 600 channels, from 600 to 1000 channels, from 600 to 800 channels, or from 800 to 1000 channels 215. Increasing the amount of channels will result in increasing the amount of product flow In some embodiments, the heat transfer medium 210 may have a combined first end face 213, second end face 214, and channels 215 surface area of from 650 to 750 mm$^2$. According to some embodiments, the surface area of the first end face 213 and the area of the second end face 214 may be the same. In other embodiments, the surface area of the first end face 213 may be less than the surface area of the second end face 214, as molecules will be produced during the reaction and will more readily exit the heat transfer medium if the surface area of the second end face 214 is larger than the surface area of the first end face 213. The heat transfer medium 210 may have a total surface area of from 0.08 to 0.2 m$^2$ per kilogram per hour of fluid flow at a velocity of from 20 to 200 m/s. The heat transfer medium may comprise from 1 to 500 heating elements, from 1 to 300 heating elements, from 1 to 200 heating elements, from 1 to 100 heating elements, from 1 to 70 heating elements, from 1 to 50 heating elements, from 1 to 30 heating elements, from 1 to 20 heating elements, from 1 to 10 heating elements, from 10 to 500 heating elements, from 10 to 300 heating elements, from 10 to 200 heating elements, from 10 to 100 heating elements, from 10 to 70 heating elements, from 10 to 50 heating elements, from 10 to 30 heating elements, from 10 to 20 heating elements, from 20 to 500 heating elements, from 20 to 300 heating elements, from 20 to 200 heating elements, from 20 to 100 heating elements, from 20 to 70 heating elements, from 20 to 50 heating elements, from 20 to 30 heating elements, from 30 to 500 heating elements, from 30 to 300 heating elements, from 30 to 200 heating elements, from 30 to 100 heating elements, from 30 to 70 heating elements, from 30 to 50 heating elements, from 50 to 500 heating elements, from 50 to 300 heating elements, from 50 to 200 heating elements, from 50 to 100 heating elements, from 50 to 70 heating elements, from 70 to 500 heating elements, from 70 to 300 heating elements, from 70 to 200 heating elements, from 70 to 100 heating elements, from 100 to 500 heating elements, from 100 to 300 heating elements, from 100 to 200 heating elements, from 200 to 500 heating elements, from 200 to 300 heating elements, or from 300 to 500 heating elements. The heating elements may be made from any material in any shape and any size that may heat the heat the channels 215 within the heat transfer medium 210 to reaction temperature. The heating elements may be one or more of heating plates, heating wires, heating tubes, heating grids, and/or any other heating device. In embodiments, the heating elements may be flat metallic members having a shape that is tailored, in conjunction with its material, to create the desired resistivity. In other embodiments, the heat transfer medium 210 will itself be made material that is sufficient to create the desired resistivity.

In some embodiments, each heating element within the heat transfer medium 210 provides heat at levels from 100 to 1000 kW, from 100 to 800 kW, from 100 to 500 kW, from 100 to 400 kW, from 100 to 350 kW, from 100 to 300 kW, from 100 to 200 kW, from 200 to 1000 kW, from 200 to 800 kW, from 200 to 500 kW, from 200 to 400 kW, from 200 to 350 kW, from 200 to 300 kW, from 300 to 1000 kW, from 300 to 800 kW, from 300 to 500 kW, from 300 to 400 kW, from 300 to 350 kW, from 350 to 1000 kW, from 350 to 800 kW, from 350 to 500 kW, from 350 to 400 kW, from 400 to 1000 kW, from 400 to 800 kW, from 400 to 500 kW, from 500 to 1000 kW, from 500 to 800 kW, or from 800 to 1000 kW. In other embodiments, the heat transfer medium may produce from 10 to 100 kW, from 10 to 80 kW, from 10 to 60 kW, from 10 to 40 kW, from 10 to 20 kW, from 20 to 100 kW, from 20 to 80 kW, from 20 to 60 kW, from 20 to 40 kW, from 40 to 100 kW, from 40 to 80 kW, from 40 to 60 kW, from 60 to 100 kW, from 60 to 80 kW, or from 80 to 100 kW per heating element. In embodiments, the heating element may include an electrical resistor material, which may use electrical current to generate heat. The heat may then be conducted through the material of the heat transfer material 210 to the channels 215. In some embodiments, the heating element may be located closer to the channels 215 than to the outer surface 216 of the heat transfer material 210. In some embodiments, the heated hydrocarbon-containing stream 112 may not directly contact the heating elements. In other embodiments, the heat transfer material 210 may function as a thermal conductor and mechanical separator between the heated hydrocarbon-containing stream 112 and the heating element.

The channels 215 of the heat transfer medium 210 may comprise boundary layer disturbing elements that increase fluid turbulence when a fluid flows through the channels 215. The boundary layer disturbing elements are any type of concavity within the surface of the channels 215 or any type of raised elevation within the surface of the channels 215. Specifically, the boundary layer disturbing elements are any deviation from the parallel plane flush with the surface of the channels 215. The boundary layer disturbing elements may be of any shape or size.

According to embodiments, the heat transfer medium 210 may further comprise one or more electrical circuits, an electrical resistor, an electrical lead line, and an electrical insulator. The one or more electrical circuits may comprise one or more electrodes. As used herein, an electrode is an electrical conductor used to make contact with a nonmetallic member which may or may not be part of the circuit. The nonmetallic member may, in embodiments include the heat transfer medium 210. The electrical circuits may be positioned in or on the heat transfer medium 210 such that the electrical circuits conduct electrical current through or on the heat transfer medium 210. In embodiments, the heat transfer medium 210 comprises one or more heating elements and one or more electrical circuits comprising electrodes, such that the heating elements are electrically coupled to the electrodes and convert electrical current to heat. In some embodiments, the heating elements may transfer heat to the heat transfer medium 210, which thermally conducts the heat from the heating elements to the channels 215. In other embodiments, the heating elements may be positioned in the channels so that the heating elements directly conduct heat into the channels. In embodiments, the electrodes may be provided on a surface of the heat transfer medium 210, incorporated into the heat transfer medium 210, or may be dispersed throughout the heat transfer medium 210. Similarly, the heating elements may, in embodiments, be provided on a surface of the heat transfer medium 210, incorporated into the heat transfer medium 210, or be dispersed throughout the heat transfer medium 210. The surface of the heat transfer medium 210 may include the first end face 213 and the second end face 214 of the heat transfer medium 210. As used herein, an electrical lead line is an electrical coupling consisting of a length of wire or a metal pad that is designed to electrically couple two locations, such as, for example, by coupling the above-mentioned electrical circuits to a power source.

An electrical insulator is a material whose internal electric charges do not flow freely; very little electric current will flow through it under the influence of an electric field. The property that distinguishes an electrical insulator from other materials, such as conductors and semiconductors, is their electrical resistivity; insulators have higher resistivity than semiconductors or conductors. Nonlimiting examples of electrical insulators may include glass or ceramic which can withstand operating conditions in the heat transfer medium 210. Furthermore, the electrical insulators may be gas tight, meaning that gas may not leak from the heat transfer medium 210 through the electrical insulators.

Resistors precisely provide the amount of resistance in an electrical circuit; providing more control over resistivity than insulators. In embodiments, a resistor is a passive two-terminal electrical component that implements electrical resistance as a circuit element. As nonlimiting examples, resistors may be used to reduce current flow and to divide voltages, thereby controlling the heat generated. Furthermore, resistors may be used to convert electrical current to heat. Fixed resistors have resistances that only change slightly with temperature, time, or operating voltage. The electrical resistors may include a resistor specifically selected for specific electrical resistance with the intent of generating heat. Electrical resistors may be provided on the surface of the heat transfer medium 210, incorporated into the heat transfer medium 210, or be dispersed throughout the heat transfer medium 210. Thus, in one or more embodiments, electrical current is introduced to the heat transfer medium, and the electrical current is converted to heat by the resistors, thereby heating the heat transfer medium and, in turn, heating the channels within the heat transfer medium.

In some embodiments, the electrical insulator may be provided between the electrical resistors and the interior chamber of the pressure containment vessel 200, such that the heat created by the conversion of electrical current to heat by the electrical resistors may be contained within the heat transfer medium 210 and not dissipate into the interior chamber of the pressure containment vessel 200.

In some embodiments, the reactor system is coupled to a source of electrical current that provides electrical current to the heat transfer medium 210 via the electrical lead lines. The electrical lead lines transfer the electrical current from the source of electrical current to the heat transfer medium 210 disposed within the pressure containment vessel 200 via an electrical coupling with both the source of electrical current and the heat transfer medium 210. In various embodiments, the source of electrical current may be a renewable energy source, leading to no $CO_2$ emissions. The source of electrical current may, in embodiments, be a battery, solar power, nuclear power, wind energy, steam energy, natural gas, hydroelectric power, coal, or the like. The electrical current may be increased or decreased outside of the system, such as by variable frequency drive technology.

In some embodiments, the heat transfer medium 210 comprises one or more reaction zones. In embodiments, the heat transfer medium 210 comprises at least two reaction zones. The at least two reaction zones may be in parallel or in series. Each of these at least two reaction zones may independently receive electrical current that may be converted to heat. The voltage of the electrical current along with the specific amperes of the electrical current are indicative of the heat of the heat transfer medium 210. Specifically, the temperature of the heat transfer medium 210 during the process of converting the heated hydrocarbon-containing stream 112 may be determined from the values of the resistivity of the heat transfer medium 210 and the amperes of the electrical current that is converted to heat in the heat transfer medium 210. Joule's first law states that the power (P) of heating generated by an electrical conductor is proportional to the product of its resistance (R) and the square of the current (I), as shown by Equation 1:

$$P \propto I^2 R \quad (1)$$

Various zones of the heat transfer medium 210 may, according to embodiments, be designed to have differing resistivities, which may be taken into account when determining the desired heat of the heat transfer medium 210 within specific zones. This may be accomplished by providing different resistor materials and/or different quantities of resistor materials at the different zones of the heat transfer medium 210. Differing resistivities may lead to differing amounts of heat generation in various zones of the heat transfer medium 210. Differing amounts of heat generation in various zones of the heat transfer medium 210 may also be accomplished by varying the electrical current in the heat transfer medium 210.

According to embodiments, the use of molten salt is to cool down the gas expelled from the heat transfer medium 210 as quickly as possible. In conventional systems, this is done via boiling water as a heat sink from 800° C. to 850° C., or even down to 600° C. This generates steam at a temperature of 300° C. to 350° C. This is effective from a chemical reaction perspective but destroys a lot of exergy. However, in systems according to embodiments disclosed herein, which use electrical heating instead of combustion heating, the steam does not need to be used in downstream applications. So, this energy can be fed back to the heat transfer medium 210, which results in significant energy savings According to embodiments, the pressure of the interior chamber of the pressure containment vessel 200 may be modified without heating any of the first end 200a of the pressure containment vessel 200, the second end 200b of the pressure containment vessel 200, the at least one sidewall 200c of the pressure containment vessel 200, or the heat transfer medium 210. This is possible because the heat transfer medium 210 disposed within the pressure containment vessel 200 is not heated by combustion as is conventionally done. Conventional reactor systems utilize combustion to create the reaction conditions necessary for thermally treating a hydrocarbon-containing stream. Combustion creates both elevated temperature required for upgrading hydrocarbon-containing streams, thereby inextricably linking the temperature and pressure conditions. Conversely, reactor systems and processes, according to embodiments provided herein, for thermally treating a hydrocarbon-containing stream create the elevated temperature and pressure required for the reaction through separate mechanisms. Specifically, the temperature of reaction is reached by converting electrical current to heat in the heat transfer medium 210, and the elevated pressure, if necessary, is created through conventional processes known in the art that do not also increase the temperature within the pressure containment vessel 200.

According to embodiments, the hydrocarbon-containing stream 111 may comprise at least one of methane, ethane, propane, butane, water ($H_2O$), and low levels of $CO_2$, CO, $N_2$, CO, $CO_2$, and $H_2$. In some embodiments, the hydrocarbon-containing stream 111 comprises $C_1$ to $C_5$ hydrocarbons. In other embodiments, the hydrocarbon-containing stream 111 comprises $C_1$ to $C_{20}$ hydrocarbons. In yet another embodiment, the hydrocarbon-containing stream 111 comprises $C_1$ to $C_{50}$ hydrocarbons.

The pressure containment vessel 200, according to embodiments, may use steam to convert the heated hydrocarbon-containing stream 112 to an effluent 211 comprising carbon monoxide (CO) and hydrogen through a steam methane reforming process in the heat transfer medium 210. For instance, according to one or more embodiments, the outlets of the channels 215 of the heat transfer medium 210 is at equilibrium for the following reactions: (1) $CH_4 + H_2O \rightarrow CO + 3H_2$; and (2) $CO + H_2O \rightarrow H_2 + CO_2$. Additionally, unreacted methane and water will be present at the outlets of the channels 215 of the heat transfer medium 210. In some embodiments, CO, $CO_2$, and $N_2$ may be present at the outlets of the channels 215 of the heat transfer medium 210. Furthermore, in some embodiments, a nickel-based catalyst may be present in this reaction. Although the temperature at which the heat transfer medium 210 is operated is not particularly limited so long as it can drive the above reactions, in one or more embodiments, the heat transfer medium 210 is operated at an inlet temperature from 400 degrees Celsius (° C.) to 450° C., such as from 415° C. to 435° C., or about 425° C. Likewise, the pressure at which the pressure containment vessel 200 is operated at an inlet temperature from 400 degrees Celsius (° C.) to 450° C., such as from 415° C. to 435° C., or about 425° C. In some embodiments, the heat transfer medium 240 is operated at an inlet temperature of greater than 600° C., greater than 700° C., greater than 800° C., greater than 900° C., greater than 950° C., greater than 1000° C., greater than 1050° C., or of up to 1100° C. Likewise, the pressure at which the pressure containment vessel 200 is operated is not particularly limited so long as it can drive the above reactions, in one or more embodiments, the pressure containment vessel 200 is operated at a pressure of 38 bar (3.8 MPa) to 46 bar (4.6 MPa), such as from 40 bar (4.0 MPa) to 44 bar (4.4 MPa), or about 42 bar (4.2 MPa). In embodiments, the feed into the heat transfer medium 210 may comprise from 30 wt % methane to 40 wt % methane, such as from 33 wt % methane to 38 wt % methane, or about 36 wt % methane. Accordingly, in embodiments, the hydrocarbon-containing stream 111 into the heat transfer medium 210 may comprise from 60 wt % water to 70 wt % water, such as from 62 wt % water to 67 wt % water, or about 63 wt % water.

Converting the heated hydrocarbon-containing stream 112 to the effluent 211 may comprise further increasing the temperature of the heated hydrocarbon-containing stream 112, thereby causing a chemical reaction that produces the effluent 211. The heated hydrocarbon-containing stream 112 may be contacted with the channels 215 of the heat transfer medium 210 under reaction conditions sufficient to form an effluent 211. According to embodiments, the reaction conditions may comprise: a temperature ranging from 300° C. to 450° C., or from 600° C. to 1200° C., such as from 800° C. to 1000° C., or from 825° C. to 900° C.; and a pressure of at least 1 bar (100 kPa), such as at least 2 bar (200 kPa), or at least 3 bar (300 kPa). In other embodiments, the pressure may at least 10 bar (1000 kPa), at least 15 bar (1500 kPa), at least 25 bar (2500 kPa), at least 30 bar (3000 kPa), at least 40 bar (4000 kPa), or at least 50 bar (5000 kPa). It should be understood that any combination of the above temperatures and pressures may be combined in embodiments. In some embodiments, the heat transfer medium 210 is heated to a temperature of greater than 600° C., greater than 800° C., greater than 900° C., greater than 950° C., greater than 1000° C., greater than 1050° C., greater than 1110° C., greater than 1150° C., greater than 1200° C., or greater than 1500° C. The reactions that occur in in channels 215 of the heat transfer medium 210 produce an effluent 211. In some embodiments, the reactions that occur in the pressure containment vessel 200 further produce byproducts comprising one or more of CO, $CO_2$, $H_2$, $H_2O$, and $CH_4$.

The exit stream 212 comprises at least one of hydrogen, olefins, and aromatic hydrocarbons. In one or more embodiments, the exit stream 212 consists essentially of or consists of at least one of hydrogen, olefins, and aromatic hydrocarbons. In embodiments, the olefins comprise $C_2$ to $C_5$ olefins such as, for example, ethylene ($C_2H_4$), propylene ($C_3H_6$), and butylene ($C_4H_8$). In other embodiments, the olefins comprise $C_2$ to $C_{10}$ olefins. The olefins may comprise $C_2$ to $C_{20}$ olefins. In yet another embodiment, the olefins may comprise $C_2$ to $C_{50}$ olefins. In some embodiments, the olefins may comprise diolefins, such as butadiene. The aromatic hydrocarbons may comprise benzene and derivatives thereof, such as toluene, ethylbenzene, o-xylene, p-xylene, m-xylene, mesitylene, durene, 2-phenylhexane, and biphenyl. The exit stream 212 is collected and used in various other processes to make desired end products.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A reactor system for thermally treating a hydrocarbon-containing stream comprising:
   a heat sink reservoir comprising molten salt;
   a pressure containment vessel comprising:
      an interior chamber defined by a first end, a second end, and at least one sidewall extending from the first end to the second end,
      a heat transfer medium that converts electrical current to heat and is positioned within the interior chamber of the pressure containment vessel, wherein the heat transfer medium comprises:
         a first end face;
         a second end face; and
         channels extending between the first end face and the second end face, and
      a heat exchanger positioned within the interior chamber of the pressure containment vessel and downstream from the heat transfer medium, wherein the heat exchanger:
         is fluidly coupled to the heat transfer medium;
         is thermally coupled to the heat sink reservoir;
         is configured to house the molten salt; and
         is configured to transfer heat to the molten salt; and
   a heater positioned upstream from the heat transfer medium, wherein the heater:
      is fluidly coupled to the heat transfer medium,
      is thermally coupled to the heat sink reservoir,
      is configured to house the molten salt, and
      is configured to transfer heat from the molten salt.

2. The reactor system of claim 1, wherein the molten salt is selected from the group consisting of lithium fluoride (LiF), beryllium fluoride ($BeF_2$), zirconium tetrafluoride ($ZrF_4$), sodium fluoride (NaF), rubidium fluoride (RbF), potassium fluoride (KF), potassium carbonate ($K_2CO_3$), lithium carbonate ($Li_2CO_3$), sodium carbonate ($Na_2CO_3$), and combinations thereof.

3. The reactor system of claim 1, wherein the molten salt has a heat capacity from 1.65 J/g K to 2.10 J/g K.

4. The reactor system of claim 1, wherein a pressure of the interior chamber of the pressure containment vessel can be modified without heating any of the first end of the pressure containment vessel, the second end of the pressure containment vessel, the at least one sidewall of the pressure containment vessel, and the heat transfer medium.

5. The reactor system of claim 1, wherein the heat transfer medium is formed from a material selected from the group consisting of ceramics, metals, and graphite.

6. The reactor system of claim 1, wherein the heat transfer medium comprises silicon carbide.

7. The reactor system of claim 1, wherein the heat transfer medium has a total power of from 5 to 50 kW.

8. The reactor system of claim 1, wherein:
   the heat transfer medium has a combined first end face, second end face, and channels surface area of from 650 to 750 $mm^2$; and
   the heat transfer medium has a total surface area of from 0.08 to 0.2 $m^2$ per kilogram per hour of fluid flow at a velocity of from 20 to 200 m/s.

9. The reactor system of claim 1, wherein:
   the heat transfer medium comprises from 50 to 70 heating elements; and
   the heat transfer medium produces from 10 to 1000 kW per heating element.

10. The reactor system of claim 1, wherein the molten salt has a heat capacity from 1.80 J/g K to 1.95 J/g K.

11. A process for thermally treating a hydrocarbon-containing stream comprising:

introducing the hydrocarbon-containing stream to a heater, wherein the heater houses molten salt, and the molten salt is at a first temperature;

heating the hydrocarbon-containing stream at the heater by transferring heat from the molten salt to the hydrocarbon-containing stream, thereby decreasing a temperature of the molten salt to a third temperature;

transferring the molten salt at the third temperature to a heat sink reservoir comprising a supply of the molten salt;

introducing the hydrocarbon-containing stream into channels of a heat transfer medium positioned downstream from the heater, wherein the heat transfer medium is positioned within an interior chamber of a pressure containment vessel, the heat transfer medium comprising a first end face, a second end face, and the channels extending between the first end face and the second end face;

supplying electrical current to the heat transfer medium positioned within the interior chamber, the interior chamber defined by a first end, a second end, and at least one sidewall extending from the first end to the second end;

converting the electrical current to heat, thereby heating the hydrocarbon-containing stream within the channels of the heat transfer medium;

converting the hydrocarbon-containing stream to an effluent within the channels of the heat transfer medium;

removing the effluent from the channels of the heat transfer medium;

introducing the effluent into a heat exchanger positioned downstream from the heat transfer medium within the interior chamber, wherein the heat exchanger houses molten salt, and the molten salt is at the first temperature;

transferring heat from the effluent to the molten salt and increasing a temperature of the molten salt to a second temperature; and transferring the molten salt at the second temperature to the heat sink reservoir comprising the supply of molten salt.

12. The process of claim 11, wherein a difference in temperature between a temperature of molten salt entering the heat exchanger and a temperature of effluent entering the heat exchanger is from 200° C. to 400° C.

13. The process of claim 11, wherein a difference in temperature between a temperature of the hydrocarbon-containing stream and a temperature of the molten salt within the heater is from 5° C. to 30° C.

14. The process of claim 11, wherein a temperature of the supply of molten salt is approximately the same as the first temperature.

15. The process of claim 11, wherein the second temperature is greater than the first temperature.

16. The process of claim 11, wherein the third temperature is less than the first temperature.

* * * * *